United States Patent Office 3,044,991
Patented July 17, 1962

3,044,991
POLYURETHANE PLASTICS
Erwin Müller and Otto Bayer, Leverkusen, and Julius Peter, Odenthal, Germany, assignors to Farbenfabriken Bayer Aktiengesellschaft, Leverkusen, Germany, a corporation of Germany
No Drawing. Filed Aug. 17, 1959, Ser. No. 833,977
Claims priority, application Germany Aug. 21, 1958
8 Claims. (Cl. 260—77.5)

This invention relates generally to the preparation of polyurethane plastics and, more particularly, to a vulcanized substantially nonporous rubber-like polyurethane plastic and to a method for making the same.

It has been proposed heretofore to prepare a solid, substantially nonporous, rubber-like polyurethane plastic by a process in which an organic compound containing groups containing at least two hydrogen atoms reactive with an —NCO group and a chain extender are reacted with an organic diisocyanate. Processes of this type are disclosed in U.S. Patents 2,620,516 and 2,621,166. In accordance with such a process, a storage stable thermoplastic adduct or millable gum similar to a raw rubber sheet is formed in a first step and cured by addition of more diisocyanate in a second step. In a modification of this type of process, an unsaturated polyester prepared by using an unsaturated acid, such as, for example, maleic acid, is reacted with the organic diisocyanate. Because of the unsaturation, the resulting adduct can be converted into a cross-linked elastomeric product by vulcanizing it with sulfur in the presence of suitable vulcanizing accelerators. It has also been proposed to use polyalkylene ether glycols as the organic compound containing groups containing at least two hydrogen atoms reactive with an —NCO group in conjunction with an unsaturated glycol, such as, for example, monoallyl glycerine ether in the preparation of an adduct, which can be vulcanized with sulfur. Polyalkylene ether glycols containing an aliphatically unsaturated side chain have been proposed for preparing sulfur vulcanizable compositions in U.S. Patent 2,808,391. In each of these modifications of the basic process, the adduct contains reactive double bonds which are attacked by the sulfur to cause cross-linking. The product obtained by these processes is not entirely suitable for some purposes because the aliphatically unsaturated adduct is not storage stable because it is subject to degradation by oxidation and the substantially nonporous elastomers formed from such an adduct are not resistant to aging and ozone. In order to avoid the use of a polyester containing aliphatic unsaturation, it has been suggested that polyesters which do not contain any group suitable for cross-linking should be used in conjunction with a compound containing groups which are suitable for cross-linking, such as, for example, an unsubstituted aryl di(hydroxyethoxy) amine, in the reaction with the isocyanate which leads to the formation of the elastomer. The elastomers resulting from such a reaction are not entirely suitable because of their mechanical properties and because they are not completely storage stable.

It is, therefore, an object of this invention to provide a method for making a vulcanizable adduct of an organic diisocyanate and an organic compound containing groups containing at least two hydrogen atoms reactive with an —NCO group devoid of the foregoing disadvantages. Another object of the invention is to provide a method for making an improved storage stable vulcanizable adduct of an organic polyisocyanate and an organic compound containing groups containing at least two hydrogen atoms reactive with an —NCO group. Still another object of the invention is to provide an improved method for forming a vulcanized substantially nonporous, rubber-like polyurethane elastomer or, in other words, a substantially nonporous rubber-like polyurethane plastic.

The foregoing objects and others are accomplished in accordance with this invention, generally speaking, by providing a method for making a vulcanized, solid, substantially nonporous, rubber-like polyurethane plastic wherein an organic compound free from aliphatic unsaturation and containing at least two active hydrogen-containing groups, said active hydrogen-containing groups being reactive with an —NCO group, and an alkyl-substituted phenyl di(hydroxyalkyl) amine and an organic diisocyanate are reacted to form an adduct free from aliphatic unsaturation, which adduct is later vulcanized with sulfur. The alkyl substituted phenyl di(hydroxyalkyl) amine can be represented by the formula

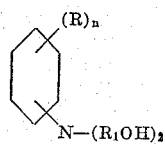

wherein R is a lower alkyl radical of from 1 to 5 carbon atoms, $n$ is an integer of 1 to 2 and $R_1$ is a lower alkylene radical of from 1 to 5 carbon atoms. A reaction of these components results in the formation of a storage stable polyaddition product or adduct which is adapted to be cured by vulcanization with sulfur in the presence of known vulcanization accelerators to produce a substantially nonporous rubber-like polyurethane plastic having advantageous mechanical characteristics. The invention thus contemplates the preparation of a cross-linked substantially nonporous rubber-like polyurethane plastic by vulcanization with sulfur of an adduct free from aliphatic unsaturation and formed by reaction between an organic diisocyanate, an organic compound having a molecular weight of more than about 1000, free from aliphatic unsaturation and containing at least two active hydrogen-containing groups, said active hydrogen-containing groups being reactive with an —NCO group, and an alkyl-substituted phenyl di(hydroxyalkyl) amine. The total amount of alkyl-substituted phenyl di(hydroxyalkyl) amine and organic compound having active hydrogen-containing groups used should be at least equivalent to the amount of organic diisocyanate used. Stated in another way, the total number of hydroxyl groups furnished by the first said reactants should be at least equal to the total number of —NCO groups furnished by the diisocyanate.

Any suitable alkyl-substituted phenyl di(hydroxyalkyl) amine may be used, such as, for example, N-di(hydroxyethyl)-m-toluidine, N-di(hydroxyethyl) - 3,5 - xylidine, N - di(hydroxyethyl)-2,6-diethyl-aniline, N - di(hydroxyethyl) - 2,6 - dimethyl-aniline, the di(hydroxyisopropyl) derivatives, such as, for example, N-di(hydroxyisopropyl)-m-toluidine, N-di(hydroxyisopropyl)-3,5-xylidine and the like. These alkyl-substituted phenyl di(hydroxyalkyl) amines can be prepared by known processes, such as, for example, by reacting an alkylene oxide with a primary amine. For example, either ethylene oxide or propylene oxide may be reacted with a suitable primary amine, such as, toluidine, to form a glycol of the type contemplated by this invention. It is absolutely necessary that the aryl di(hydroxyalkyl) amine be alkyl-substituted in order to obtain the high elongation in combination with the desirable tensile strength. The product obtained from an unsubstituted aryl di(hydroxyalkyl) amine is more thermoplastic than the product of this invention possibly because the linking of the aromatic nuclei with sulfur is slower than it is with an alkyl-substituted phenyl di(hydroxyalkyl) amine. The hydroxyalkyl groups may be the same or different. Preferably, the alkyl group attached directly to the phenyl radical is a lower alkyl group, such as, methyl, ethyl, propyl or butyl.

The alkyl-substituted phenyl di(hydroxyalkyl) amine proposed herein may be used in conjunction with any of the known substantially linear organic compounds containing at least two active hydrogen-containing groups provided that the molecular weight of this compound is more than 1000 and it is substantially free from aliphatic unsaturation. Examples of such compounds include polyesters free from aliphatic saturation prepared by condensation of saturated aliphatic or aromatic dicarboxylic acids including adipic acid, malonic acid, succinic acid, suberic acid, sebacic acid, phthalic and terephthalic acid and the like including those disclosed in U.S. Patent Reissue 24,514. Suitable glycols include diethylene glycol, propylene glycol, ethylene glycol, 1,4-butanediol and other saturated glycols including those disclosed in the aforesaid reissue patent. Alternately, the inorganic compound having a molecular weight of more than 1000 and containing active hydrogen-containing groups may be a polyalkylene ether glycol, such as, for example, polyethylene ether glycol, polypropylene ether glycol, polytetramethylene ether glycol or the like. The polyalkylene ether glycols may be prepared by known methods using a lower alkylene oxide, such as, for example, ethylene oxide, propylene oxide or the like. Polythioethers having a molecular weight of more than 1000 and prepared by condensation of thioether glycols including thiodiglycol may also be used. Polyacetals having hydroxyl groups and a molecular weight of more than 1000 and prepared from an aldehyde and an alcohol, such as, formaldehyde and ethylene glycol, may be used.

Any suitable organic diisocyanate, such as, for example, 2,4-toluylene diisocyanate, 2,6-toluylene diisocyanate, 4,4'-diphenylmethane diisocyanate, hexamethylene diisocyanate, 1,4-naphthylene diisocyanate, 1,5-naphthylene diisocyanate, hexahydro-p-phenylene diisocyanate and the like may be used. As indicated hereinbefore, the amount of organic diisocyanate used should be such that the number of —NCO groups is at most equivalent to the number of hydroxyl groups present in the reaction mixture.

The storable polyaddition products which are to be used according to the invention and which correspond to a raw rubber sheet are in other respects produced in a manner known per se, it being possible for the reaction of the separate components to take place in a different sequence. For example, the organic compound containing active hydrogen-containing groups and having a molecular weight higher than 1000 can first of all be mixed with the alkyl-substituted phenyl di(hydroxyalkyl) amine and then the reaction can take place with such a quantity of the diisocyanate that all diisocyanate groups are used up. According to another method given by way of example, it is, however, possible first of all to react the organic compound containing active hydrogen-containing groups and having a molecular weight above 1000 with an excess of organic diisocyanate and then to add the alkyl-substituted phenyl di(hydroxyalkyl) amine in such a proportion that after its reaction, there are no longer any free —NCO groups in the polyaddition products.

Preferably the amount of alkyl-substituted dihydroxyalkyl amine used will be from about 5 percent to about 30 percent by weight based on the weight of organic compound containing active hydrogen-containing groups and a molecular weight of above 1000 used.

The resulting thermoplast or adduct which can be stored and rolled can be vulcanized according to the invention at some later time, if desired, with sulfur in the presence of vulcanization accelerators known for rubber and in the manner usual in the rubber industry. For example, the adduct can be vulcanized with sulfur on heated mixing rollers and then shaping until it is converted into an elastomeric end product. At temperatures from about 100° C. to about 180° C., the vulcanization is completed in about 30 minutes. It is possible to make advantageous use of the shearing forces of friction rollers. As vulcanization accelerators, there are to be mentioned by way of example 2-mercaptobenzthiazole, 2-mercaptobenzthiazyl disulfide or the zinc chloride complexes thereof and the like. Fillers and lubricants conventionally used in making polyurethane elastomeric products can be concurrently employed in the usual manner.

The product provided by this invention can be used for molding machine parts, such as, bearing surfaces and for making vehicle tires.

*Example 1*

About 1 kilogram of a glycol adipic acid polyester (OH number 56) is dehydrated at about 130° C./12 mm. At this temperature, about 263 grams of 4,4'-diphenylmethane diisocyanate are stirred into the melt. This is condensed for about 30 minutes at a temperature of about 130° C. to about 140° C., then allowed to cool to about 90° C. and about 108 grams of N-di(hydroxyethyl)-m-toluidine are added in one lot while stirring well. Without further heating, the temperature rises to about 100° C. to about 130° C. with further stirring and with a simultaneous increase in viscosity. After about another 10 minutes, provided the melt can still be stirred, it is poured out on to metal plates and heated for about another 24 hours at about 100° C. A thermoplastic sheet which can be rolled is thereby obtained, this sheet having a Defo value of 725/20°.

Into about 100 parts of the product, there are incorporated on the roller about:

1.5 parts of sulfur,
1.0 part of 2-mercaptobenzthiazole,
3.0 parts of 2-mercaptobenzthiazyl disulfide,
0.5 part of zinc chloride complex of the 2-mercaptobenzthiazyl disulfide,
30.0 parts of carbon black, and
1.0 part of stearic acid.

The mixture is pressed for 30 minutes at about 150° C. and yields a material having the following properties:

Tensile strength _____kg./cm.$^2$__ 238
Breaking elongation _____percent__ 640
Permanent elongation _____do____ 36
Shock elasticity _____do____ 45
Shore hardness _____degrees__ 65
Resistance to further tearing (ring test strength)
                                                                          kg./cm__ 18
Stress value at 300% elongation _____kg./cm.$^2$__ 93

*Example 2*

If about 1 kilogram of 1,2-propylene glycol-adipic acid polyester (OH number 55), about 230 grams of 4,4'-diphenylmethane diisocyanate and about 75 grams of N-di(hydroxyethyl)-m-toluidine are reacted in the manner indicated in Example 1, there is obtained a thermoplastic sheet which can be rolled and which has a Defo value of 1250/20° C., and after incorporating the components referred to in Example 1, there is obtained an elastomeric product with the following physical properties:

Tensile strength _____kg./cm.$^2$__ 211
Breaking elongation _____percent__ 605
Permanent elongation _____do____ 16
Shore hardness _____degrees__ 60
Resistance to further tearing (ring test strength)
                                                                          kg./cm__ 14
Stress value at 300% elongation _____kg./cm.$^2$__ 62

*Example 3*

If about 1 kilogram of a tetrahydrofuran polymer (OH number 43), about 218 grams of 4,4'-diphenylmethane diisocyanate and about 100 grams of N-di(hydroxyethyl)-m-toluidine are reacted by the procedure indicated in Example 1, there is obtained a raw sheet having a Defo value of 1750/20°.

After admixing the components referred to in Example 1, there is obtained after pressing an elastomeric product with the following physical properties:

| | |
|---|---|
| Tensile strength kg./cm.² | 250 |
| Breaking elongation percent | 630 |
| Permanent elongation do | 22 |
| Shock elasticity do | 18 |
| Shore hardness degrees | 61 |
| Strain value at 300% elongation kg./cm.² | 74 |

It is to be understood that any of the other alkyl-substituted phenyl di(hydroxyalkyl)amines disclosed as suitable herein may be substituted for those in the foregoing examples and that any other suitable organic compound containing active hydrogen-containing groups and the required molecular weight may be substituted for the particular ones used in the examples. Moreover, any other suitable diisocyanate may be used in lieu of the ones set forth in the foregoing examples. The invention in its broadest aspects contemplates any process for preparing a polyurethane plastic from saturated components including an alkyl-substituted phenyl di(hydroxyalkyl) amine and is not limited to any particular manipulative steps or to the use of any particular organic compound containing active hydrogen-containing groups because any known compound of this type can be used. Likewise, the invention is not restricted to the use of any particular saturated diisocyanate but, on the contrary, contemplates the use of any organic diisocyanate suitable for preparing a substantially nonporous rubber-like polyurethane plastic.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method for making a polyurethane elastomer which comprises reacting an organic dissocyanate with an organic compound containing at least two reactive hydrogen atoms and having a molecular weight of more than about 1000, said organic compound being reactive with said organic diisocyanate to form a polyurethane, and a compound having the formula

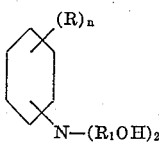

wherein R is an alkyl radical having from 1 to 5 carbon atoms, $R_1$ is an alkylene radical having from 1 to 5 carbon atoms and $n$ is an integer of from 1 to 2, the number of hydroxyl groups of the said reactants being at least equivalent to the number of —NCO groups of the organic diisocyanate and vulcanizing the resulting adduct with sulfur to form a vulcanized, substantially nonporous polyurethane elastomer.

2. An adduct adaptable for vulcanizing with sulfur to form a substantially nonporous rubber-like polyurethane plastic which comprises the reaction product of an organic diisocyanate and a saturated organic compound containing at least two reactive hydrogen atoms and having a molecular weight of more than about 1000, said organic compound being reactive with said diisocyanate to form a polyurethane, and a compound having the formula

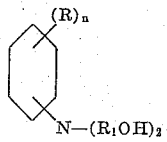

wherein R is an alkyl radical having from 1 to 5 carbon atoms, $R_1$ is an alkylene radical having from 1 to 5 carbon atoms and $n$ is an integer of from 1 to 2, the number of hydroxyl groups of the said reactants being at least equivalent to the number of —NCO groups of the organic diisocyanate.

3. A solid substantially nonporous rubber-like polyurethane plastic prepared by a process which comprises reacting an organic diisocyanate and a saturated organic compound containing at least two reactive hydrogen atoms and having a molecular weight of more than about 1000, said organic compound being reactive with said diisocyanate to form a polyurethane, and a compound having the formula

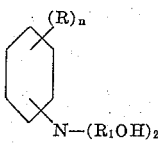

wherein R is an alkyl radical having from 1 to 5 carbon atoms, $R_1$ is an alkylene radical having from 1 to 5 carbon atoms and $n$ is an integer of from 1 to 2, the number of hydroxyl groups of the said reactants being at least equivalent to the number of —NCO groups of the organic diisocyanate, and thereafter vulcanizing the resulting adduct with sulfur.

4. The process of claim 1 wherein said alkyl-substituted phenyl di(hydroxyalkyl) amine is N-di(hydroxyethoxy)-m-toluidine.

5. The process of claim 1 wherein said organic compound containing groups containing hydrogen atoms is reacted with the said organic diisocyanate and the resulting adduct is reacted with the alkyl-substituted phenyl di(hydroxyalkyl) amine and the product of the latter reaction is vulcanized with sulfur, said alkyl radicals having from 1 to 5 carbon atoms.

6. The adduct of claim 2 wherein the alkyl-substituted phenyl di(hydroxyalkyl) amine is N-di(hydroxyethyl)-m-toluidine.

7. The product of claim 3 wherein the alkyl-substituted phenyl di(hydroxyalkyl) amine is N-di(hydroxyethyl)-m-toluidine.

8. The process of claim 5 wherein the alkyl-substituted phenyl di(hydroxyalkyl) amine is N-di(hydroxyethyl)-m-toluidine.

References Cited in the file of this patent

UNITED STATES PATENTS

| | | |
|---|---|---|
| 2,257,817 | Seymour | Oct. 7, 1941 |
| 2,432,023 | Lecher | Dec. 2, 1947 |
| 2,843,568 | Benning et al. | July 15, 1958 |
| 2,843,569 | Benning et al. | July 15, 1958 |

UNITED STATES PATENT OFFICE
CERTIFICATE OF CORRECTION

Patent No. 3,044,991                                                  July 17, 1962

Erwin Müller et al.

It is hereby certified that error appears in the above numbered patent requiring correction and that the said Letters Patent should read as corrected below.

Column 3, line 18, for "inorganic" read -- organic --; colum 5, line 40, for "dissocyanate" read -- diisocyanate --; column 6, line 45, after "amine" insert -- , said alkyl radicals having from 1 to 5 carbon atoms, --.

Signed and sealed this 18th day of December 1962.

(SEAL)
Attest:

ERNEST W. SWIDER                                       DAVID L. LADD
Attesting Officer                                      Commissioner of Patents